(12) United States Patent
Kemeny et al.

(10) Patent No.: US 9,618,265 B2
(45) Date of Patent: Apr. 11, 2017

(54) METHOD FOR TAPPING A STEEL MAKING FURNACE

(71) Applicant: Nupro Corporation, Lewiston, NY (US)

(72) Inventors: Frank L. Kemeny, Lewiston, NY (US); David I. Walker, Bolton (CA)

(73) Assignee: Nupro Corporation, Lewiston, NY (US)

( * ) Notice: Subject to any disclaimer, the term of this patent is extended or adjusted under 35 U.S.C. 154(b) by 199 days.

(21) Appl. No.: 14/526,681

(22) Filed: Oct. 29, 2014

(65) Prior Publication Data

US 2016/0123669 A1 May 5, 2016

(51) Int. Cl.
| | | |
|---|---|---|
| C21C 5/42 | (2006.01) | |
| F27B 3/28 | (2006.01) | |
| F27D 3/15 | (2006.01) | |
| F27B 3/19 | (2006.01) | |
| C21C 5/46 | (2006.01) | |
| C21C 5/52 | (2006.01) | |

(52) U.S. Cl.
CPC .............. *F27B 3/28* (2013.01); *C21C 5/4673* (2013.01); *F27B 3/19* (2013.01); *F27D 3/1509* (2013.01); *C21C 2005/468* (2013.01); *C21C 2005/5288* (2013.01); *Y02P 10/216* (2015.11)

(58) Field of Classification Search
CPC .................................................... F27D 3/1509
USPC .......................................................... 75/375
See application file for complete search history.

(56) References Cited

U.S. PATENT DOCUMENTS

| | | | |
|---|---|---|---|
| 4,592,067 A | 5/1986 | Fuchs et al. | |
| 5,279,639 A | 1/1994 | Kemeny et al. | |
| 5,968,227 A | 10/1999 | Goldstein et al. | |
| 6,255,983 B1 | 7/2001 | Meszaros et al. | |
| 6,737,014 B2 | 5/2004 | Davidkhanian et al. | |
| 6,923,843 B1 | 8/2005 | Kemeny et al. | |
| 6,929,773 B2 | 8/2005 | Kemeny et al. | |
| 7,468,090 B2 | 12/2008 | Kemeny et al. | |
| 8,097,063 B2 | 1/2012 | Kemeny et al. | |
| 2007/0119275 A1* | 5/2007 | Kemeny | C21C 5/5211 75/10.12 |
| 2009/0230159 A1* | 9/2009 | Fleischanderl | B22D 37/00 222/590 |

* cited by examiner

*Primary Examiner* — Scott Kastler
(74) *Attorney, Agent, or Firm* — John M. Hammond; Patent Innovations LLC

(57) ABSTRACT

A method of tapping a steelmaking furnace comprised of determining a desired level of steel to be attained in a ladle, and calculating the weight of molten steel that will be present when the desired level is attained following a transfer of molten steel from the furnace to the ladle. The furnace is operated such that slag is formed on top of molten steel contained therein. The furnace is moved to a first position to cause transfer of molten steel to the ladle to begin. The transfer of molten steel from the furnace to the ladle is continued, and at the first occurrence of molten steel attaining the desired level in the ladle, molten steel attaining a maximum allowable weight in the ladle, or an excessive amount of slag being present upon the molten steel in the ladle, transfer of molten steel to the ladle is ceased.

15 Claims, 2 Drawing Sheets

METHOD FOR TAPPING A STEEL MAKING FURNACE

BACKGROUND

Technical Field

This invention relates to the tapping of steel from a steelmaking furnace such as an electric arc furnace (EAF) into a receiving vessel such as a ladle. More particularly, a method and apparatus for filling the ladle to a target level instead of to a target weight are disclosed. The method and apparatus enable a larger average tap weight per heat and therefore higher plant production rate.

Description of Related Art

In EAF steel production, the liquid steel is covered by primary steelmaking slag, mostly composed of oxides of metals, including calcium, silicon, iron, magnesium, aluminum, and manganese oxides. This primary slag is high in iron oxide content and is "oxidizing" with respect to acceptable dissolved oxygen content in steel prior to casting. Therefore, it is not suitable for further steel refining operations. During pouring of the molten steel, it is preferable not to let this slag flow from the furnace into the ladle, since it is usually undesirable in the next step of steel refining.

Historically, steel was commonly tapped from an electric arc furnace through a tapping spout in the side of the furnace. This method resulted in substantial quantities of slag pouring from the furnace along with the steel. U.S. Pat. No. 4,592,067 of Fuchs et al. discloses an apparatus designed to tap a furnace substantially "slag free" by replacing the tapping spout with a bottom tap hole, eccentrically placed. This and other similar arrangements have become common in the art. The eccentric bottom tap hole, or "EBT" as it is known in the art, has reduced the average amount of slag carried into the ladle from the furnace during tapping. For the EBT to function properly, a percentage of steel must be held inside the furnace to support the slag above the tap hole and prevent it from entering the ladle. This steel is called the "hot heel" and may be approximately 5% to 50% of the total charge, depending on the process. The approximate yield of liquid steel is typically known and the scrap charge weights are calculated to yield an average tap weight of steel while maintaining the desired hot heel amount for the next batch of steel. In the art, each batch of steel is commonly referred to as a "heat."

The ladle that receives the steel from the EBT furnace is lined with refractory oxide material. This material wears away through erosion and chemical reactions, so a ladle has limited lifespan before it requires a new refractory lining. Typically, about 70-85% of the thickness of the refractory lining is worn away during the course of the useful life of that ladle lining, after which new refractory oxide is once again deployed in the ladle to start a new lining campaign, i.e., a series of heats performed over the lifetime of that ladle refractory lining. The volume of the ladle therefore increases with each heat tapped into it from the first heat to the last in the lining campaign. Since each heat is tapped to a constant target weight, the level of steel in the ladle decreases as the ladle lining wears away. It is not uncommon for the level of steel in the ladle to vary by approximately two feet or more during the course of a ladle lining campaign.

There are several disadvantages to the current method in the art of tapping steel to a consistent weight. One disadvantage is that tapping to a consistent weight results in variability of the level of slag that floats on the molten steel in the ladle. There is always slag disposed on top of the steel in the ladle, and this level range in the ladle refractory lining is referred to as the slag line. The refractory lining material must be of high quality at the slag line to resist the chemical attack by the slag. This material is often more costly than the other refractory material in the remainder of the ladle. The variable slag line position requires a large area of slag line refractory material. Less slag line-compatible refractory would be needed, and thus a lower cost of refractory materials would be incurred if the steel level and associated slag line were consistent within the ladle.

Another disadvantage of the variable steel level associated with tapping to a consistent weight is that the electrodes of the ladle metallurgy furnace (LMF) must be long enough and have large range of motion in the vertical direction to accommodate the variable steel level. This necessitates longer graphite electrodes, and a higher oxidation rate of the graphite. Thus a higher electrode cost per ton of steel refined is incurred.

There is also a practical limit to the level of steel that may occupy the ladle volume. Some steel refining processes are carried out in the ladle, causing turbulence and splashing of steel and slag. It is desirable to retain the steel and slag within the ladle. In vacuum tank degassing, for example, the process causes large wave formation and surface turbulence. The vacuum causes gas bubbles to form in the steel, increasing its volume. Therefore, the steel level must be kept a meter or more from the top of the ladle to ensure containment of the ladle contents. The distance between the top of the ladle and the surface of the contents of the ladle is referred to as the "freeboard." If vacuum degassing is not required, but the heat will be treated with bottom gas stirring and arc heating, then a freeboard of about ½ meter may be appropriate. An even smaller freeboard may be used if the steel will not be subjected to secondary refining. Overall, the freeboard requirement defines a practical limit for filling the ladle.

Another aspect that can limit the level to which a ladle can be filled is the ladle lifting crane capacity. Molten steel is considerably more dense than refractory lining material, and thus a ladle that is filled to a target freeboard level and that has had a large amount of the refractory eroded away and its volume replaced with molten steel is much heavier that the same ladle filled to the same target freeboard level, but with a new and thicker refractory liner. It is conceivable that a ladle near the end of its useful lining life filled with steel to the target freeboard level can exceed a crane's safe lifting capacity. In such cases, the target freeboard level must be reduced commensurate with the applicable weight limitations.

For example, consider a typical steelmaking ladle with design capacity of 150 tons and new working lining refractory brick thickness of 8 inches. After 100 heats, the working lining thickness has been reduced to 2 inches and further use of the ladle is considered unsafe. The target weight of 150 tons of steel is matched with the target freeboard of the new ladle. The last heat on that ladle may have an additional 40 tons of capacity of molten steel to reach that target freeboard. For the sake of simplicity, if it is stipulated that each heat of steel generates equal excess capacity in the ladle, then the average steel weight in the ladle can be increased by 20 tons, or approximately 13%. A prerequisite for this scenario is adequate crane capacity to support the added weight. At present, to the best of the Applicants' knowledge, there is no method practiced in the art in which the steel is tapped to a consistent freeboard while anticipating the tap weight in order to make appropriate corrections to charge weight and alloy additions at tap.

What is needed is a method of tapping an electric arc furnace that maximizes yield and throughput of steel while reducing costs of the overall steel refining process.

SUMMARY

In one aspect of the present invention, steel is tapped from a furnace vessel to a receiving vessel, such as a ladle, to a predetermined desired level, i.e., a freeboard level. In certain embodiments, this is done in a manner that maximizes the amount of steel tapped in each heat, thereby increasing overall production rate of a steelmaking facility.

In another aspect of the invention, an algorithm is provided by which the weight of steel yielded in each of a sequence of heats is predicted, as well as the charge and alloy additions calculations for each heat.

In another aspect of the invention, an algorithm is provided by which the duration of tap and the weight of steel tapped is predicted. Having knowledge of the duration of tap can assist an operator in making a decision to terminate the tap at the appropriate time to achieve the target freeboard. Additionally, having knowledge of the tap weight can facilitate an operator to make accurate scrap charge and alloy addition calculations and perform the subsequent charge and alloy additions to the furnace and/or receiving vessels.

The present invention meets the aforementioned need by providing a method of tapping a steelmaking apparatus comprised of a furnace vessel and a first receiving vessel. The method is comprised of determining a desired level of steel to be attained in the first receiving vessel, and determining the weight of molten steel that will be in the first receiving vessel when the desired level in the first receiving vessel is attained following a transfer of molten steel from the furnace vessel to the first receiving vessel. The apparatus is operated such that a volume of slag disposed on top of a volume of molten steel is formed within the furnace vessel. The furnace vessel is moved to a first position to cause transfer of molten steel from the furnace vessel to the first receiving vessel to begin. The transfer of molten steel from the furnace vessel to the first receiving vessel is continued while determining the level of molten steel in the first receiving vessel and the weight of molten steel in the first receiving vessel. At the first occurrence of molten steel attaining the desired level in the first receiving vessel, molten steel attaining a maximum allowable weight in the first receiving vessel, or excessive slag present upon a surface of the molten steel in the first receiving vessel, the furnace vessel is moved to a second position to cease transfer of molten steel from the furnace vessel to the first receiving vessel.

In certain embodiments, the furnace vessel may be an electric arc furnace vessel comprising a vessel wall including a tap hole formed therethrough. The tap hole in the vessel wall may be an eccentric bottom tap hole. Causing transfer of molten steel from the furnace vessel to the first receiving vessel to begin may be further comprised of opening a valve on the tap hole, thereby causing flow of molten steel through the tap hole. The first receiving vessel may be a ladle.

The excessive slag present upon the surface of the molten steel in the first receiving vessel may be determined by infrared imaging of the surface. In certain embodiments, the presence of excessive slag may be determined by determining at least one of brightness or contrast of an image obtained from the infrared imaging of the surface, and comparing the at least one of brightness or contrast with a predetermined threshold indicative of excessive slag present. In other embodiments, the presence of excessive slag may be determined by determining the duration of slag spreading across the surface of the molten steel from the infrared imaging of the surface, and comparing the rate with a predetermined threshold indicative of excessive slag present.

The method may further comprise estimating the amount of molten steel of the first batch of steel remaining in the furnace vessel after ceasing transfer of molten steel from the furnace vessel to the first receiving vessel, obtaining data on the condition of a refractory liner of a second receiving vessel to receive molten steel from tapping a second batch of steel from the furnace vessel, and predicting a desired level of steel to be attained in the second receiving vessel from tapping the second batch of steel from the furnace vessel. Such a method may further comprise predicting the weight of steel to be attained in the second receiving vessel from tapping the second batch of steel from the furnace vessel, and/or predicting the time required for tapping the second batch of steel from the furnace vessel.

Advantageously, the method of the present disclosure may be employed so as to maximize batch size of steel produced by each heat, thereby increasing overall production rate of steel; to facilitate variable scrap charge requirements made necessary by the variable tap weights; to facilitate the tap addition requirements necessary for each tap weight, as these materials are typically batched prior to tapping the heat; and to provide the operator with an image of the filling ladle to improve the safety of the furnace tapping operation. These will be explained in further detail subsequently herein.

It is to be understood that although the present invention is disclosed in the context of tapping steel from a furnace into a ladle, and more particularly, tapping a furnace having an eccentric bottom tap hole, the invention has applicability to a wide range of pouring procedures. For example, the present invention may be practiced when tapping steel from a spout furnace into a ladle, when such a spout furnace is operated with a heel.

BRIEF DESCRIPTION OF THE DRAWINGS

The present disclosure will be provided with reference to the following drawings, in which like numerals refer to like elements, and in which.

DETAILED DESCRIPTION

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

Figure 1:
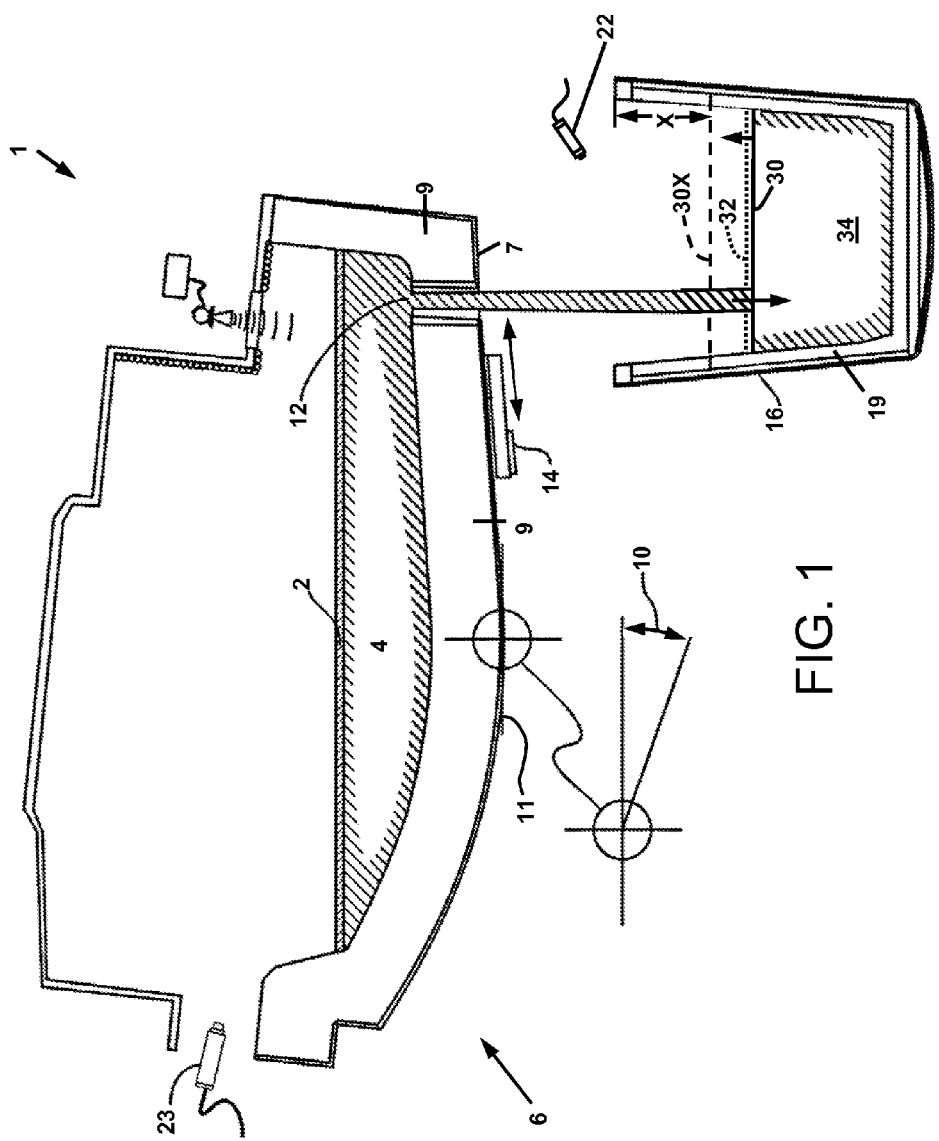
FIG. 1 is a schematic diagram of an apparatus for tapping steel to a target level in a ladle.

Referring first to FIG. 1, an apparatus 1 for tapping steel to a target level in a receiving vessel is depicted during the tapping process. During the steelmaking process, slag and molten steel are formed within a furnace vessel. In general, the furnace vessel may be operated to form slag and molten steel, and to vary the position of the furnace vessel during the tapping process as disclosed in U.S. Pat. No. 7,468,090 of Kemeny et al., the disclosure of which is incorporated herein by reference.

In the steelmaking process, a volume of slag 2 floats on top of a volume of steel 4 within the furnace vessel 6. The furnace vessel 6 may be tilted over a range of angles around the horizontal position indicated by plane 11. The furnace vessel 6 may include an eccentrically located tap hole 12 formed in the bottom wall 7 of the furnace vessel 6. During tapping, flow through the tap hole 12 may be controlled by slide gate valve 14. In such an embodiment, tapping the furnace vessel 6 begins by opening slide gate valve 14. Molten steel 4 flows through slide gate 14 into a receiving vessel 16. The receiving vessel 16 may be a ladle, although other receiving vessels may be used to receive the molten steel.

As the steel 4 drains from the furnace vessel 6 through tap hole 12, the furnace angle 10 may be advanced to maintain maximum head of steel 4 over the tap hole 12 so that tapping rate is maximized and slag 2 is prevented from entering the ladle 16. A camera 22 may be disposed at a location such that it may observe and record the rising level 30 of molten steel 34 in the receiving ladle 16 during at least part of the tapping process.

Figure 2:
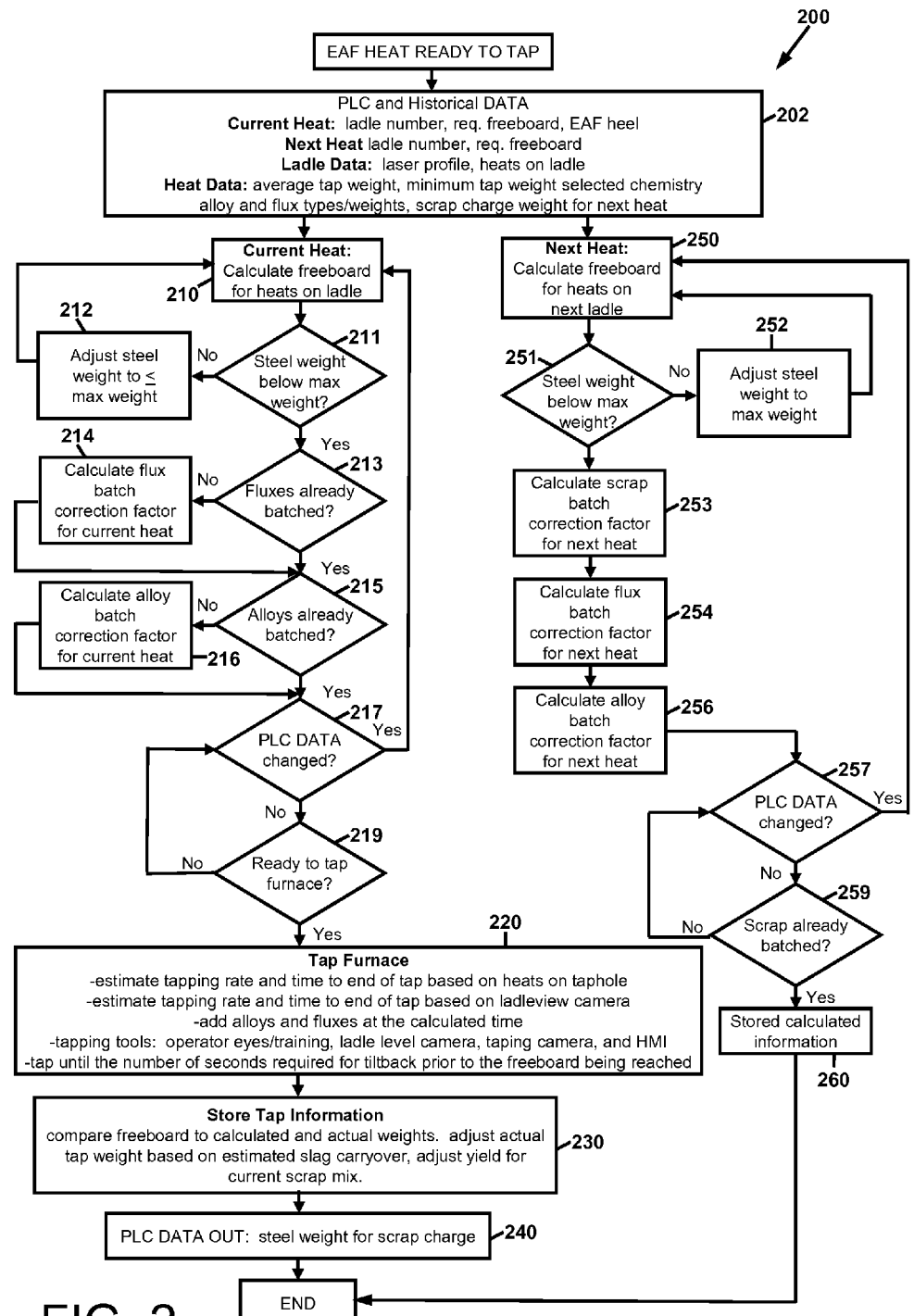
FIG. 2 is a flowchart that depicts a method for tapping a steelmaking furnace in accordance with the present disclosure.

Referring also to FIG. 2, methods 200 of tapping a steelmaking apparatus are depicted. In a broad aspect of the invention, steel is tapped from a furnace vessel to a receiving vessel, while also "looking forward" in the overall steelmaking process so as to predict the furnace operating parameters and the tapping parameters for at least the next heat. By predicting the steelmaking parameters for the next heat, and operating the steelmaking apparatus accordingly, the amount of steel tapped in each successive heat is maximized without causing upset conditions of insufficient furnace charge or incorrect alloy additions, thereby increasing overall production rate of the steelmaking furnace.

The methods 200 are based upon the premise that steelmaking is practiced as a batch process using a batch apparatus, such as, but not limited to, apparatus 1 of FIG. 1. The Applicants have recognized that in making steel using the batch apparatus, certain conditions in the steelmaking process will vary from batch to batch; variation of these certain conditions cannot be avoided. While it is possible to operate the steelmaking apparatus with a set of fixed parameters that will enable steelmaking over the range of possible variation of the certain variable conditions, performing the steelmaking in that manner is disadvantageous, because doing so results in the production of steel at an overall production rate that is lower than it otherwise could be if steps were taken to "look forward" and predict steelmaking parameters for at least the next batch of steel to be made. Additionally, when the certain variable conditions vary to near or beyond certain limits, if steelmaking parameters are not predicted for a next batch of steel, and instead the steelmaking process is operated with fixed parameters, an unacceptable batch of steel may be made, resulting in yield loss with associated costs.

Referring also to FIG. 1, one condition that varies significantly from batch to batch in steelmaking is the size of the tap hole 12 in the steelmaking furnace. Refractory oxide materials used in steel making are typically damaged over time by chemical and physical attack in the aggressive steel making environment. The tap hole 12 is lined with refractory oxide material and is subject to wear by steel and slag passing through it. The tap hole 12 erodes successively with each batch of steel and becomes larger. This has a direct effect on the tapping process for each batch of steel, because the size of the hole affects the flow of steel therethrough, as well as the entrainment of slag flowing with the molten steel. The successive wear and increasing diameter of the tap hole 12, while not necessarily linear, is at least monotonic and predictable to an extent from batch to batch, based on historical data.

A second condition that varies significantly from batch to batch in steelmaking is the thickness of the refractory liner 19 of the ladle 16, which receives molten steel 34 and slag 32 during the tapping operation. However, this condition does not vary monotonically from batch to batch in succession. The refractory liner 19 of a ladle 16 erodes successively with each batch of steel until it is so thin as to not provide sufficient insulation and containment strength, and must be replaced. The refractory liner 19 of a ladle 16 will typically last for about 50 to 150 batches until replacement is necessary, depending on the secondary refining method used and on the grade of steel being processed therein. While it is true that a refractory liner wears monotonically, the variation in refractory liners from batch to batch in steelmaking is very large, because numerous ladles 16 are used in the steelmaking process. Such ladles 16 cycle through the steelmaking operation: each ladle 16 receives a tap of steel, and proceeds on to a downstream operation where it pours out the molten steel, and is then recycled back into the steelmaking receiving line (if its liner is still sufficiently thick and replacement is not necessary).

Thus from batch to batch, the thickness of the liners 19 of ladles 16 can vary from that of a newly installed liner, to that of one that will need to be replaced as it reaches end of life. A ladle 16 with a newly installed liner 19 has a minimum volume available to receive molten steel 34 and slag 32 during a tap, and a ladle 16 with a liner 19 at the end of its useful life has a maximum volume available to receive molten steel 34 and slag 32 during a tap. In general, a ladle 16 with a liner 19 near end of life can receive about 7 to 25% (depending on the size of the ladle) more molten steel 34 and slag 32 than a ladle 16 with a new liner 19. This has a substantial effect on the volume of steel and slag that must be tapped into a ladle 16 to reach a desired freeboard X, i.e., a desired level 30X (FIG. 1) of steel to be attained in the ladle 16.

As described previously, the freeboard is a practical limit for filling the ladle 16, i.e., the highest level to which the ladle 16 may be filled with molten steel 34 and slag 32 without it splashing out of the ladle 16 (which would be a safety hazard as well as a yield loss). In order to maximize overall production rate of the steelmaking apparatus 1, it is desirable that for each heat, the freeboard X in the ladle 16 be reached. However, because of the variation in ladle volume from ladle to ladle due to refractory liner wear, this means that the volume of molten steel available in the furnace vessel to be tapped in a given heat must be varied to match the available volume needed to reach freeboard in the ladle that is being used in that heat. The Applicants have realized that accordingly, in the preparation of any given batch of steel, it is advantageous to prepare the batch of steel according to a method in which the steelmaking process is controlled based on certain parameters pertaining to that batch of steel, as well as based on the prediction of certain parameters pertaining to the next batch of steel. This will now be explained in further detail with reference to FIGS. 1 and 2.

A steelmaking apparatus 1 is controlled via a Programmable Logic Controller (PLC) or other suitable computer (not shown). The PLC may include a Human Machine Interface (HMI), which may include a display screen, a touch screen, a mouse, a keyboard, a loud speaker, microphone, and other suitable input and output devices (none shown).

In step 202, certain data are entered and/or uploaded into the PLC. Some data pertain to the current heat, and other data pertain to the next heat. Current heat data include the ladle number (or other identifying indicia for that ladle), the required freeboard for that ladle and that batch of steel, the number of heats that ladle has processed with its current refractory liner, and laser profile data if available. In sum, these data define the volume in that ladle that is available up to its freeboard level to receive steel during a tap. Current heat data also include an estimate of the hot heel volume remaining in the furnace vessel 6 from the previous tap, and the average tap weight, minimum tap weight, and weights of alloy and flux agents to be added to the ladle 16 during the tapping operation. These parameters are partially dependent upon the chemistry of the batch of steel, i.e., the composition of the alloy of steel to be made in this current heat. Additionally, the estimated scrap charge weight for the next heat is also entered into the PLC.

Tapping of the current heat proceeds according to the steps on the left portion of FIG. 2. In step 210, the weight of molten steel 34 and slag 32 that is required to be transferred from furnace vessel 6 to ladle 16 in order to reach its desired freeboard level X is calculated, taking into account the available volume in that ladle 16 based on the condition (i.e., thickness) of its refractory liner 19. A series of decision gates ensue. At gate 211, a check is made as to whether the calculated weight needed to reach the desired freeboard level is below the maximum weight that can be received by the ladle 16. Such weight is typically determined by the load capacity of the crane (not shown) or other lifting device that will be needed subsequently to lift the ladle and its contents. If the calculated weight results in a total weight that exceeds the maximum allowable weight, then in step 212, a new weight of tapped steel and slag is calculated that is less than or equal to the maximum allowable weight. Using this new weight, step 201 is repeated in which a new value X of freeboard is calculated.

If the calculated weight results in a total weight that is less than the maximum allowable weight, or once the new value of freeboard X is calculated, gate 213 ensues. If the fluxes to be added to the ladle 16 during or after the tap have already been batched (i.e. prepared for addition to the ladle), then gate 215 ensues. Otherwise, in step 214, a flux batch correction factor is calculated before proceeding to gate 215. If the alloys to be added to the ladle 16 during or after the tap have already been batched, then gate 217 ensues. Otherwise, in step 216, an alloy batch correction factor is calculated before proceeding to gate 217.

At gate 217, a final check is made to determine if any data for the batch has been changed (e.g., such as data pertaining to what alloy is being made), in which case it may be necessary to cycle back through steps/gates 210-216. At gate 219, a final determination is made as to whether the furnace is ready to tap. If not, such as due to some unforeseen circumstances, disruption, or change in production plan, it is again considered in gate 217 as to whether any data in the PLC has changed or should be changed.

If the furnace is ready to tap, step 220 ensues. With the most current value of the freeboard having been calculated, the tapping rate and time to end of tap are estimated based upon knowledge of the number of heats that have passed through the tap hole 12. The tapping rate and time to end of tap may also be based upon observations using the ladle view camera 22. As described previously, the apparatus 1 is operated such that a volume of slag 2 disposed on top of a volume of molten steel 4 is formed within the furnace vessel 6. In the tapping operation 220, the furnace vessel 6 is moved to a first position to cause transfer of molten steel 4 from the furnace vessel 6 to the receiving vessel 16 to begin. The transfer of molten steel 4 from the furnace vessel 6 to the receiving vessel 16 is continued while determining the level 30 of molten steel 34 in the receiving vessel 16, the weight of molten steel 34 in the receiving vessel 16, and the amount of slag 32 on the molten steel 34 in the receiving vessel 16. Additionally, alloy and flux agents are added to the ladle at the time(s) calculated for that particular tap and ladle.

The tap proceeds to termination, at which time tilt back of the furnace vessel begins, factoring in how much time is required to tilt the furnace back to a "home" position. Real time decisions may be made as to when to terminate the tap based upon operator experience and observations from the ladle camera 22 and furnace vessel camera 23. In particular, if it is observed that excessive slag 32 is being transferred into the ladle 16, the tap may be terminated earlier than the calculated prediction. It is noted that the yielded liquid steel from the scrap charged in the furnace vessel 6 is not typically consistent, so therefore at times, less steel, i.e., the heel, remains in the furnace than what is expected. In these cases, it is possible that the slag 2 passes through the tap hole 12 in substantial quantity, entering ladle 16, and forming a slag layer 32 on the molten steel 34 in the ladle 16. This is undesirable and in such case the tapping operation is terminated early as noted above.

However, it is also noted that in the tapping process, there is always some slag that enters the ladle 16 from the furnace vessel 6. In a typical EBT tapping operation, this may be from about 500 to 1500 lb., depending on tapping rate and heat size. As the tap hole 12 wears, it is normal that the amount of slag transferred from the furnace vessel 6 to the ladle 16 goes up somewhat, but if the heel in the furnace vessel 6 gets too low, then much more slag can vortex into the ladle. In most steelmaking operations, two to three times the normal amount is considered unacceptable enough to cause early termination of the tap. During the tapping process, the presence of excessive slag is detected by watching the surface of the molten steel and slag as it rises up in the ladle 6. The surface gets very bright (emissive) if there is excessive slag, since the slag floats and spreads across the ladle 16, thus forming a substantially continuous highly emissive surface. This may be detected visually by an operator of the furnace, or by automated analysis of images of the surface obtained by the camera 22.

More specifically, in certain embodiments, the surface of the molten fluid in the ladle may be imaged either continuously via a video camera 22, or intermittently via still images acquired at a rapid rate from camera 22. The imaging may be infrared imaging as disclosed in U.S. Pat. No. 5,968,227 of Goldstein, which discloses use an infrared camera to image a tapping stream flowing out of a basic oxygen furnace. The disclosure of this United States patent is incorporated herein by reference.

The Applicants have discovered that imaging the surface of the molten fluid in the ladle, and preferably imaging an area located away from the tapping stream entering the ladle, is effective in determining if an excess amount of slag has entered the ladle. It has been observed that if the tapping stream is molten steel, it is dense with large momentum, and it enters the receiving ladle flowing through and under the surface any slag that is present in the ladle. Under these circumstances, this slag surface is relatively cool and looks dark in the image. However, if slag is present in the tapping stream, then it floats up around the entering stream and spreads across the surface of the molten steel in the ladle. In this condition, the higher slag surface temperature in the ladle thus appears much brighter, especially in an infrared image. This is so with any image, including a visible light image. However, it is most pronounced with a thermal (infrared) image since the hot slag spreading across the surface is much brighter and appears with much greater contrast compared to the molten steel or lower temperature slag that was already present in the ladle.

Thus a threshold may be predetermined with respect to image contrast and/or brightness, which is identified as the threshold at which excessive slag is present in the ladle. Alternatively or additionally, the duration of the hot slag spreading across the surface may be monitored. It has been observed that once the flow of hot slag across the surface starts, it does not stop until the tapping stream is forced to stop. Therefore, the duration of the surface brightness between first appearance and end of tapping, or any point therebetween, can be correlated to the relative amount of slag that has entered the ladle. From previous experimental observations, a threshold of image brightness and duration is determined, at which point an "end tap" alarm may be triggered due to excessive slag entering the ladle.

Thus in certain embodiments, any one of three criteria may be used as an indicator to cease the tapping operation: if a) the first occurrence of molten steel 34 attaining the desired level 30X in the receiving vessel 16, or b) molten steel 34 attaining a maximum allowable weight in the receiving vessel 16, or c) an excessive amount of slag 32 present upon the molten steel 34 in the receiving vessel 16 occurs, then the furnace vessel 6 is moved to the home position or a second position to cease transfer of molten steel 4 from the furnace vessel 6 to the receiving vessel 16.

Referring again to FIG. 2, in step 230, tap information from the heat is stored in the PLC for use in subsequent furnace and tapping operations. The data may include the actual freeboard level X attained in the ladle 16, and the actual weight of molten steel 34 and slag 32 transferred in the tap. Additionally, the amount of slag 32 transferred to the ladle 16 may be estimated. This parameter is indicative of the heel remaining in the furnace vessel 6 that is available to start the next batch of steel. If it is observed or estimated that an excessive amount of slag has been transferred, then it is likely that the remaining heel is less than desired, and the amount of scrap added to result in the desired heel is adjusted accordingly.

In step 240, the amount of scrap steel to be added to the furnace vessel for the preparation of the next batch of steel is calculated. This amount is based upon the heel remaining in the furnace vessel 6, and also upon the predictive steps performed on the right portion of FIG. 2 as will now be explained.

In step 250, and with knowledge in particular of the available volume of the next ladle per the condition of its refractory liner, the freeboard of the next heat is calculated. At gate 251, a check is made as to whether the calculated weight needed to reach the desired freeboard level is below the maximum weight that can be received by the ladle 16, as described previously. If the calculated weight results in a total weight that exceeds the maximum allowable weight, then in step 252, a new weight of tapped steel and slag is calculated that is less than or equal to the maximum allowable weight. Using this new weight, step 251 is repeated in which a new value X of freeboard is calculated.

Subsequently, in steps 253, 254, and 256, scrap, flux, and alloy batch corrections factors may be calculated. At gate 257, a check is made to determine if any data for the batch has been changed, in which case it may be necessary to cycle back through steps/gates 250-256. At gate 259, a determination is made as to whether a full charge of scrap steel has been batched into the furnace vessel 6. If not, then whether or not any further change to PLC data is necessary may be reconsidered at gate 257. If yes, then the melting of the full charge of scrap steel in the furnace vessel is underway, and in step 260, all of the calculated parameters for that next batch of steel are stored in the PLC. A full loop of the method 200 is thus completed. The method restarts at step 202.

EXAMPLES

The following hypothetical examples illustrate how the present invention may be used in steelmaking. It is to be understood that these examples are not to be considered as limiting, but rather as illustrative of certain embodiments of the methods of the present invention.

Example 1

A batch of steel is melted in an eccentric bottom tapped electric arc furnace. After the batch is at the desired temperature and chemistry, a receiving ladle is positioned under the tap hole of the furnace. This will be the 13$^{th}$ heat in this receiving ladle since a new refractory lining was installed. The desired freeboard is 14 inches. Based on typical lining wear, it is calculated that the ladle will contain 127 tons of steel with the level at the desired freeboard in the ladle. The electric furnace heel is 20 tons, which is the desirable heel amount.

Ladles are rotated through the steelmaking process; for any given ladle, the number of heats that it has received with its current refractory liner may vary from zero (for a ladle with a new refractory liner) to about 75. The next ladle in the rotation has had 40 heats on the lining since new. It is calculated that this next heat will have 131 tons of steel in this next ladle at the desired freeboard. Typical yield of liquid steel is 90% of the charged scrap with the current scrap blend. Therefore, 145.7 tons of scrap will be charged to the electric furnace for the subsequent heat. For the current heat, alloy and flux additions are calculated based on the current 127 ton predicted tap weight. As the steel begins to tap from the furnace into the ladle, the operator can view the camera image and other information on his human-machine interface (HMI) screen. A countdown to the end of tap is displayed so the operator can anticipate when the desired freeboard is reached. A long wavelength infrared camera is affixed in a position that allows viewing of the inside of the ladle as it is being filled. The field of view includes about 50% of the height of the inside of the ladle, as measured from the top down. Therefore, there is no visible hot liquid level rising in the ladle until about halfway through the tap. Once the level becomes visible, the rate of liquid rising is calculated and the countdown to the desired freeboard level is corrected as necessary. Once the desired freeboard has been reached, the operator terminates the tap by tilting the furnace backward. The actual freeboard is measured after tap and corresponds to the desired freeboard. The actual weight is measured at 126 tons, indicating that wear on this ladle is less than expected. The appropriate adjustments are made for this ladle for future calculations.

Example 2

A heat of steel is scheduled to tap from an EBT in the next few minutes and the subsequent heat's charge weight is to be calculated. There is a ladle disposed beneath the EBT to receive the scheduled next heat. The subsequent heat will use a ladle in the rotation that has had 74 heats tapped into it since receiving a new refractory lining. The desired freeboard is 14 inches. Based on typical lining wear, it is calculated that the ladle will contain 137 tons of steel with the level at the desired freeboard in the ladle.

However, the safe crane lifting capacity requires that no more than 133 tons of steel be tapped into a ladle. Therefore, the new desired freeboard of 17 inches is input to the next tap calculations. The furnace scrap charge for this next heat is calculated as 148 tons. Subsequently, during the tapping of the current heat, it is noticed that more furnace slag than usual is passing through the tap hole into the ladle near the end of tap. This indicates that the heel in the furnace has dropped to less than the desirable amount. Therefore, a further correction is applied to the charge weight of the next heat, increasing the charge weight to 155 tons. In addition, the metal yield is adjusted to 89.5% for future calculations for this scrap blend.

Example 3

A current heat is scheduled to tap into a receiving ladle in a few minutes. The information for the subsequent heat is being collected to calculate the furnace scrap charge amount for this subsequent heat. The receiving ladle's volume is measured by laser profiling method. The desired freeboard is 14 inches. The information from the laser profile and the density of liquid steel are used to calculate that there will be 130 tons of steel at the desired freeboard for this ladle. The electric furnace heel is 20 tons, which is the desirable heel amount. Typical yield of liquid steel is 90% of the charged scrap with the current scrap blend.

After the current heat is tapped, 144 tons of scrap are charged to the electric furnace for the subsequent heat. After charging the scrap and commencing the melting, the alloy additions and flux additions are calculated as appropriate for the forecast 130 tons of steel to be tapped. After melting and refining are complete, the steel begins to tap into the receiving ladle. The operator is informed that there are 350 seconds remaining to tap to the target freeboard.

A camera image shows the inside of the top half of the ladle but there is no rising steel yet visible in the image. The operator makes the alloy and flux additions at the appropriate time as indicated by the estimated level of steel in the ladle. The tapping rate from the furnace is estimated by furnace tap hole wear data and time to tap the previous heat. Based on camera angle and tapping rate, it is estimated that the rising steel will come into view with 165 seconds remaining during the tap. With the operator interface showing 170 seconds remaining in tap, the rising steel enters the image, earlier than anticipated. The tap hole wear is thus indicated greater than anticipated and an appropriate adjustment is made to the predicted tap hole size and next heat's predicted tap time. The time remaining to end of the current tap is immediately adjusted to 160 seconds on the operator interface. The tap continues and at 5 seconds remaining, the operator activates the furnace tilt back function to end the tap. The furnace takes approximately 5 seconds to tilt back and the heat is fully tapped at the predicted end time with predicted freeboard and heat weight confirmed.

It is, therefore, apparent that there has been provided, in accordance with the present invention, a method and apparatus for tapping a steelmaking furnace. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

We claim:

1. A method of tapping a steel making apparatus, the method comprising:
   a) determining a desired level of steel to be attained in a first receiving vessel from tapping a first batch of steel from a furnace vessel;
   b) determining the weight of molten steel that will be in the first receiving vessel when the desired level in the first receiving vessel is attained following a transfer of molten steel from the first batch in the furnace vessel to the first receiving vessel;
   c) forming the first batch of steel comprising a first volume of slag disposed on top of a first volume of molten steel within the furnace vessel;
   d) moving the furnace vessel to a first position to cause transfer of molten steel from the furnace vessel to the first receiving vessel to begin;
   e) continuing the transfer of molten steel from the furnace vessel to the first receiving vessel while determining the level of molten steel in the first receiving vessel and the weight of molten steel in the first receiving vessel; and
   f) moving the furnace vessel to a second position to cease transfer of molten steel from the furnace vessel to the first receiving vessel upon the occurrence of any one of: molten steel attaining the desired level in the first receiving vessel, molten steel attaining a maximum allowable weight in the first receiving vessel, or excessive slag being present upon a surface of the molten steel in the first receiving vessel;
   wherein excessive slag present upon the surface of the molten steel in the first receiving vessel is determined by determining the duration of slag spreading across the surface of the molten steel from infrared imaging of the surface, and comparing a rate of slag spreading with a predetermined threshold indicative of excessive slag present.

2. The method of claim 1 wherein the furnace vessel is an electric arc furnace vessel comprising a vessel wall including a tap hole formed therethrough.

3. The method of claim 2, wherein the tap hole is an eccentric bottom tap hole.

4. The method of claim 1 whereby the causing transfer of molten steel from the furnace vessel to the first receiving vessel to begin is further comprised of opening a valve on a tap hole formed in a wall of the furnace vessel, thereby causing flow of molten steel through the tap hole.

5. The method of claim 1, further comprising estimating the amount of molten steel of the first batch of steel remaining in the furnace vessel after ceasing transfer of molten steel from the furnace vessel to the first receiving vessel, obtaining data on the condition of a refractory liner of a second receiving vessel to receive molten steel from tapping a second batch of steel from the furnace vessel, and predicting a desired level of steel to be attained in the second receiving vessel from tapping the second batch of steel from the furnace vessel.

6. The method of claim 5, further comprising predicting the weight of steel to be attained in the second receiving vessel from tapping the second batch of steel from the furnace vessel.

7. The method of claim 5, further comprising predicting the time required for tapping the second batch of steel from the furnace vessel.

8. The method of claim 1, wherein excessive slag present upon the surface of the molten steel in the first receiving vessel is further determined by determining at least one of brightness or contrast of an image obtained from the infrared imaging of the surface, and comparing the at least one of brightness or contrast with a predetermined threshold indicative of excessive slag present.

9. A method of making steel, the method comprising:
 a) characterizing a first receiving vessel in an empty state to provide data on the first receiving vessel, and from the first receiving vessel data, determining a first volume in the first receiving vessel available for receiving steel from a furnace vessel;
 b) calculating if a weight of steel occupying the first volume in the first receiving vessel would exceed a predetermined maximum allowable weight;
 c) if the weight of steel occupying the first volume would not exceed the maximum allowable weight, calculating a first desired level of steel in the first receiving vessel to be the level attained upon filling the first volume in the first receiving vessel with steel;
 d) if the weight of steel occupying the first volume would exceed the maximum allowable weight, recalculating the first desired level of steel in the first receiving vessel to be the level attained upon filling the first receiving vessel with steel with the maximum allowable weight of steel;
 e) preparing a first batch of steel comprising a first volume of slag disposed on top of a first volume of molten steel within the furnace vessel;
 f) moving the furnace vessel to a first position to cause transfer of molten steel from the furnace vessel to the first receiving vessel to begin;
 g) continuing the transfer of molten steel from the furnace vessel to the first receiving vessel while detecting the level of molten steel in the first receiving vessel, and detecting an amount of slag upon a top surface of the molten steel in the first receiving vessel, and measuring the weight of molten steel in the first receiving vessel; and
 h) moving the furnace vessel to a second position to cease transfer of molten steel from the furnace vessel to the first receiving vessel upon the occurrence of any one of: molten steel attaining the first desired level in the first receiving vessel, molten steel attaining the maximum allowable weight in the first receiving vessel, or the amount of slag upon the top surface of the molten steel exceeding a predetermined maximum allowable amount of slag upon the top surface of the molten steel.

10. The method of claim 9, wherein the preparing the first batch of steel within the furnace vessel includes calculating a first batch volume of molten steel required to fill the first receiving vessel to the first desired level during transfer of the molten steel from the furnace vessel to the first receiving vessel, while retaining a minimum threshold volume of molten steel and slag in the furnace vessel following the transfer; estimating a volume of molten steel and slag remaining in the furnace vessel after tapping a previous batch of steel in the furnace vessel; calculating first weights of scrap steel and flux agents to be added to the furnace vessel to produce the first batch volume of molten steel, based upon the calculated first batch volume and the estimated volume of molten steel and slag remaining in the furnace vessel after tapping the previous batch of steel; and adding the calculated first weights of scrap steel and flux agents to the furnace vessel.

11. The method of claim 9, further comprising:
 a) characterizing a second receiving vessel in an empty state to provide data on the second receiving vessel, and from the second receiving vessel data, determining a second volume in the second receiving vessel available for receiving steel from the furnace vessel;
 b) calculating if a weight of steel occupying the second volume in the second receiving vessel would exceed the predetermined maximum allowable weight;
 c) if the weight of steel occupying the second volume would not exceed the maximum allowable weight, calculating a second desired level of steel in the second receiving vessel to be the level attained upon filling the second volume in the second receiving vessel with steel;
 d) if the weight of steel occupying the second volume would exceed the maximum allowable weight, recalculating the second desired level of steel in the second receiving vessel to be the level attained upon filling the second receiving vessel with steel with the maximum allowable weight of steel;
 e) preparing a second batch of steel comprising a second volume of slag disposed on top of a second volume of molten steel within the furnace vessel;
 f) moving the furnace vessel to a third position to cause transfer of molten steel from the furnace vessel to the second receiving vessel to begin;
 g) continuing the transfer of molten steel from the furnace vessel to the second receiving vessel while detecting the level of molten steel in the second receiving vessel, and detecting an amount of slag upon a top surface of the molten steel in the second receiving vessel, and measuring the weight of molten steel in the second receiving vessel; and
 h) moving the furnace vessel to a fourth position to cease transfer of molten steel from the furnace vessel to the second receiving vessel upon the occurrence of any one of: molten steel attaining the second desired level in the second receiving vessel, molten steel attaining the maximum allowable weight in the second receiving vessel, or the amount of slag upon the top surface of the molten steel exceeding the predetermined maximum allowable amount of slag upon the top surface of the molten steel.

12. The method of claim 11, wherein the preparing the second batch of steel within the furnace vessel includes calculating a second batch volume of molten steel required to fill the second receiving vessel to the second desired level during transfer of the molten steel from the furnace vessel to the second receiving vessel, while retaining the minimum threshold volume of molten steel and slag in the furnace vessel following the transfer; estimating a volume of molten steel and slag remaining in the furnace vessel after tapping the first batch of steel in the furnace vessel; calculating second weights of scrap steel and flux agents to be added to the furnace vessel to produce the second batch volume of molten steel, based upon the calculated second batch volume and the estimated volume of molten steel and slag remaining in the furnace vessel after tapping the first batch of steel; and adding the calculated second weights of scrap steel and flux agents to the furnace vessel.

13. The method of claim 9, wherein the determining the first volume in the first receiving vessel available for receiving steel from a furnace vessel is based upon an relationship of the wall thickness of the first receiving vessel as a function of the number of batches of steel received by the first receiving vessel after installation of a refractory liner in the first receiving vessel.

14. The method of claim 9, wherein the data characterizing the first receiving vessel includes measured wall thicknesses data, and wherein the determining the first volume in the first receiving vessel available for receiving steel is based upon the wall thickness data.

15. The method of claim 9, wherein the detecting that the amount of slag upon the top surface of the molten steel in the first receiving vessel exceeds the predetermined maximum allowable amount of slag includes determining the rate of slag spreading across the surface of the molten steel from infrared imaging of the surface, and comparing the rate with a predetermined threshold rate of slag spreading indicative of exceeding the predetermined maximum allowable amount of slag.

* * * * *